United States Patent Office 3,148,031
Patented Sept. 8, 1964

3,148,031
METHOD FOR SEPARATING AND PURIFYING HYDROGEN BY PERMEATION
Nathan P. Vahldieck and David I. J. Wang, Buffalo, N.Y., assignors to Union Carbide Corporation, a corporation of New York
No Drawing. Filed Feb. 8, 1961, Ser. No. 87,744
12 Claims. (Cl. 23—210)

This invention relates to a method of separating hydrogen from gaseous mixtures containing hydrogen and more specifically to a method of separating hydrogen from gaseous mixtures by permeation.

Until the present invention the purification of gas streams containing free hydrogen, such as coke oven gas, the product from the partial oxidation of methane or oil, or the product from the stream reforming of methane, by permeating the hydrogen through an imperforate metallic film such as, for example, palladium or a palladium-silver alloy has not been commercially feasible except at elevated temperatures above about 150° C. At higher temperatures problems arose because of decomposition of some components found in hydrogen-bearing streams. This decomposition tended to produce substances which might corrode, foul, or poison the imperforate film. In addition, heating the imperforate film to operating temperatures and subsequent cooling in the presence of hydrogen caused the film to become mechanically weaker. Furthermore, these elevated temperatures excluded the use of convenient construction such as soft soldering and the use of plastic gaskets.

It is accordingly an object of this invention to provide a method of separating hydrogen from a hydrogen bearing gas stream by permeation at lower temperatures then heretofore possible. It is a further object of this invention to provide an imperforate metallic film which is more permeable to hydrogen than other films heretofore employed.

Briefly, this invention involves the permeation of hydrogen through a thin imperforate metallic film that is permeable to hydrogen and which is coated with a metal hydride, wherein a hydrogen bearing gas stream under pressure is brought into contact with one side of the coated imperforate metallic film. The other side of the coated film is maintained at a lower pressure and the hydrogen permeates through the imperforate film from which it is released at the lower pressure in a purified form.

Heretofore the elevated temperature of the permeating system was an important factor to consider in determining the rate of permeation through the film. With the present invention, film permeabilities at room temperatures correspond to permeabilities associated with elevated temperatures of 300 to 400° C. in the prior art systems.

Hydrogen transfer processes can be carried out according to this invention at almost any temperature through films of tantalum, titanium, uranium, palladium or palladium-silver alloys which are coated with a dissimilar metal hydride of uranium, titanium, zirconium, thorium, or cerium.

Below about 150° C. the rate of hydrogen absorption by palladium is impractically slow. With this invention practical rates are obtained by applying a layer of dissimilar metal hydride to the film surface. A suitable layer of hydride can be produced by loosely covering the film surface with the hydride and then cyclically decomposing and reforming the hydride. Decomposition is effected by mildly vacuum annealing the coating for a short time. The hydride is reformed by admitting a hydrogen atmosphere while maintaining a temperature high enough to achieve a fairly rapid rate of hydride formation but low enough to avoid dissolving an excessive amount of hydrogen in the film surface. A suitable annealing temperature for a uranium coating on palladium, for example, would be about 250° C. This procedure reduces the particle size of the hydride and obtains a more intimate contact between the coating and the film surface.

It is believed that the overall permeation process consists of the following steps: (1) the molecular hydrogen at the metal surface dissociates and goes into solution in the palladium; (2) the dissociated hydrogen diffuses through the lattice structure of the metal; (3) upon reaching the downstream surface of the membrane, the atomic hydrogen converts to molecular hydrogen and escapes from the surface. At elevated temperatures (e.g., above 300° C.), palladium alone will catalyze the hydrogen dissociation step so that it does not seriously limit the overall rate of permeation. At lower temperatures, palladium appears to lose most of this catalytic property, and the reduced rate of dissociation becomes the predominant resistance to permeation. It is believed that an important function served by the metal hydride is to catalyze hydrogen dissociation at very low temperatures so that substantially greater amounts of atomic hydrogen are available at the palladium surface for solution therein. While coating both surfaces is considered beneficial at certain temperatures, the reverse or association reaction ($2H \rightarrow H_2$) may be rapid enough so that in many instances a coating on the upstream surface only is sufficient.

A preferred embodiment of this invention employs a palladium membrane of less than about three mil thickness, treated with titanium or uranium hydride in the above manner at least on the upstream side, which is found to be capable of permeating hydrogen at rates on the order of 9.6 standard ft.$^3$/hr. x ft.$^2$/mil thickness at ambient temperature, an upstream pressure of about 580 mm. of mercury absolute, and less than about 1 mm. of mercury absolute downstream. This rate compares with essentially zero permeation rate at ambient temperature for pure untreated palladium film. Similar improvement is also obtained by coating films of palladium-silver alloy containing 20–40% silver. Uncoated films of the latter alloys have been found to exhibit hydrogen permeation rates considerably higher than uncoated films of pure palladium due to increased solubility of hydrogen in the alloys. It should be understood that this invention is not restricted to the use of any particular apparatus or shape or form of the film. Any apparatus or procedure which has been or will be developed for the permeation of gases through films or membrane can be utilized in conjunction with the films of this invention. For example, these films could be used in the form of a tube, a membarne, or a film backed by a porous substrate.

Although the preferred embodiment of the invention has been described in detail, it is contemplated that modifications of the invention may be made and that some features may be employed without others, all within the spirit and scope of the invention.

What is claimed is:

1. A process for the recovery of hydrogen from a gaseous mixture comprising the steps of contacting such gaseous mixture with a first side of a metallic film selected from the group consisting of tantalum, titanium, uranium, palladium, and silver-palladium alloys, said first side being coated with a dissimilar metal hydride selected from the group consisting of uranium, titanium, zirconium, thorium, and cerium hydrides; permeating the hydrogen through said metallic film; and removing such permeated hydrogen from the opposite side of said metallic film.

2. A process according to claim 1 wherein the hydrogen is caused to permeate through the hydride coated metallic film at a temperature below about 150° C.

3. A process according to claim 1 wherein the dissimilar metal hydride is formed by first covering at least one side of the metallic film with the metal hydride powder, secondly mildly vacuum annealing such powder thereby thermally decomposing the hydride powder, and thirdly exposing the decomposed hydride powder to a hydrogen atmosphere thereby reforming the hydride powder into finer particles.

4. A process according to claim 3 wherein both sides of the metallic film are covered with the metal hydride.

5. A process for the recovery of hydrogen from a gaseous mixture comprising the steps of bringing such gaseous mixture into contact with a uranium hydride coated silver-palladium alloy film; causing the hydrogen to permeate through such film at temperatures below about 150° C. by maintaining a pressure differential between the two sides of the film; and removing such permeated hydrogen from the opposite side of said film.

6. A process according to claim 1 wherein the hydride coated film is less than 3 mil thick.

7. A process according to claim 5 wherein the silver-palladium film comprises 20–40% silver.

8. A process for the recovery of hydrogen from a gaseous mixture comprising the steps of contacting such gaseous mixture with a first side of a uranium hydride coated palladium film; permeating the hydrogen through the palladium film; and removing such permeated hydrogen from the opposite side of said uranium hydride coated palladium film.

9. A process according to claim 8 wherein the uranium hydride coating is formed by first covering at least one side of the palladium film with a uranium hydride powder, secondly mildly vacuum annealing such powder thereby thermally decomposing the hydride powder, and thirdly exposing the decomposed hydride powder to a hydrogen atmosphere thereby reforming the hydride powder into finer particles.

10. A process according to claim 9 wherein said powder is annealed at a temperature of about 250° C.

11. A process according to claim 9 wherein both sides of said palladium film are covered with uranium hydride.

12. A process according to claim 11 wherein said powder is annealed at a temperature of about 250° C.

References Cited in the file of this patent

UNITED STATES PATENTS

| | | |
|---|---|---|
| 2,533,138 | Newton | Dec. 5, 1950 |
| 2,536,610 | King et al. | Jan. 2, 1951 |

FOREIGN PATENTS

| | | |
|---|---|---|
| 579,535 | Canada | July 14, 1959 |

Notice of Adverse Decision in Interference

In Interference No. 95,470 involving Patent No. 3,148,031, N. P. Vahldieck and D. I. J. Wang, METHOD FOR SEPARATING AND PURIFYING HYDROGEN BY PERMEATION, final judgment adverse to the patentees was rendered Dec. 20, 1968, as to claim 1.

[*Official Gazette December 15, 1970.*]